United States Patent [19]

Wiegert et al.

[11] Patent Number: 5,787,696
[45] Date of Patent: Aug. 4, 1998

[54] PICKING ATTACHMENT FOR A HARVESTER

[75] Inventors: Ludger Wiegert, Ostbevern; Georg Krassort, Sassenberg, both of Germany

[73] Assignee: Carl Geringhoff GmbH & Co. KG, Ahlen, Germany

[21] Appl. No.: 424,301

[22] PCT Filed: Sep. 28, 1994

[86] PCT No.: PCT/DE94/01150

§ 371 Date: Apr. 24, 1995

§ 102(e) Date: Apr. 24, 1995

[87] PCT Pub. No.: WO95/17807

PCT Pub. Date: Jul. 6, 1995

[30] Foreign Application Priority Data

Dec. 27, 1993 [DE] Germany .................. 43 44 669.8

[51] Int. Cl.⁶ .................................................. A01D 45/02
[52] U.S. Cl. ........................... 56/104; 241/260.1; 460/31
[58] Field of Search ............... 56/14.6, 156, 14.3, 56/98, 104, 106, 119, 228, DIG. 9; 460/119, 31, 57, 65, 74, 77, 81, 86, 91, 92, 96, 97

[56] References Cited

U.S. PATENT DOCUMENTS

| 1,894,412 | 1/1933 | Neighbour . |
| 2,613,490 | 10/1952 | Karlsson . |
| 2,821,058 | 1/1958 | Jones ......................... 56/104 X |
| 3,069,832 | 12/1962 | Baker ......................... 56/104 X |
| 3,075,340 | 1/1963 | Raney et al. .................. 56/104 |
| 3,091,070 | 5/1963 | Wilkins et al. .............. 56/104 X |
| 3,100,491 | 8/1963 | Dillon ........................ 56/104 X |
| 4,284,247 | 8/1981 | Eriksson ..................... 241/260.1 |
| 4,732,336 | 3/1988 | Eriksson ..................... 241/261 |
| 5,009,061 | 4/1991 | Hewling ...................... 56/104 |
| 5,404,699 | 4/1995 | Christensen et al. .......... 56/104 |

FOREIGN PATENT DOCUMENTS

| 0474072 | 4/1992 | European Pat. Off. . |
| 0486887 | 5/1992 | European Pat. Off. . |
| 0492082 | 7/1992 | European Pat. Off. . |
| 2559931 | 12/1987 | France . |
| 2647299 | 11/1990 | France . |
| 1180986 | 11/1964 | Germany . |
| 1457996 | 4/1969 | Germany . |

*Primary Examiner*—Michael J. Carone
*Assistant Examiner*—Robert Pezzuto
*Attorney, Agent, or Firm*—Merchant, Gould, Smith, Edell, Welter & Schmidt

[57] ABSTRACT

A picking attachment having one or more pull-in rotors (2) and stationary comminuting tools (10), wherein the comminuting tools are in the form of rotating cutting disks (11) which are arranged on a carrier shaft (12) directed parallel to the axis of each pull-in rotor and form a cutting roller situated lower than the pull-in rotors.

11 Claims, 4 Drawing Sheets

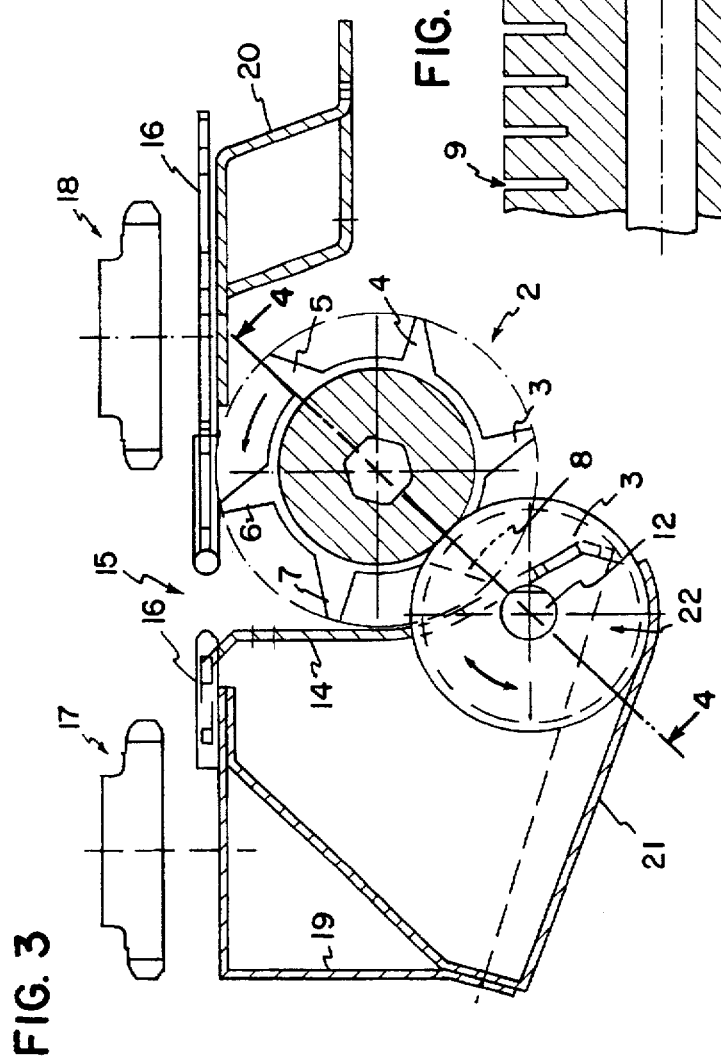
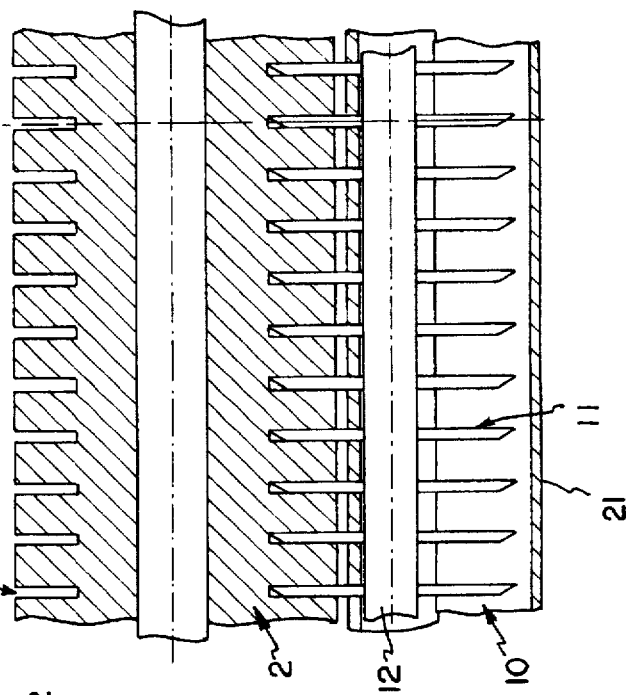
FIG. 3
FIG. 4

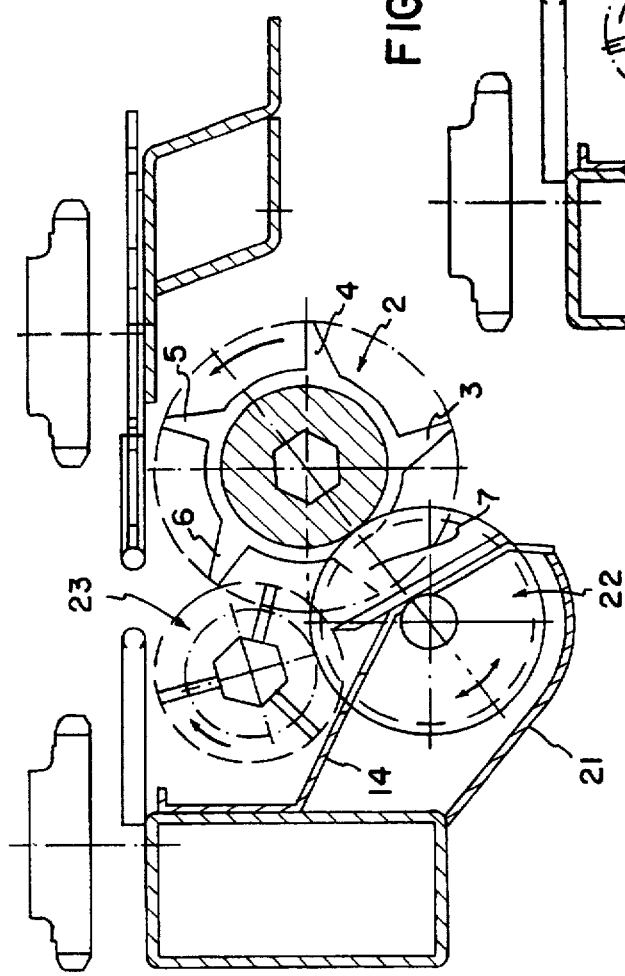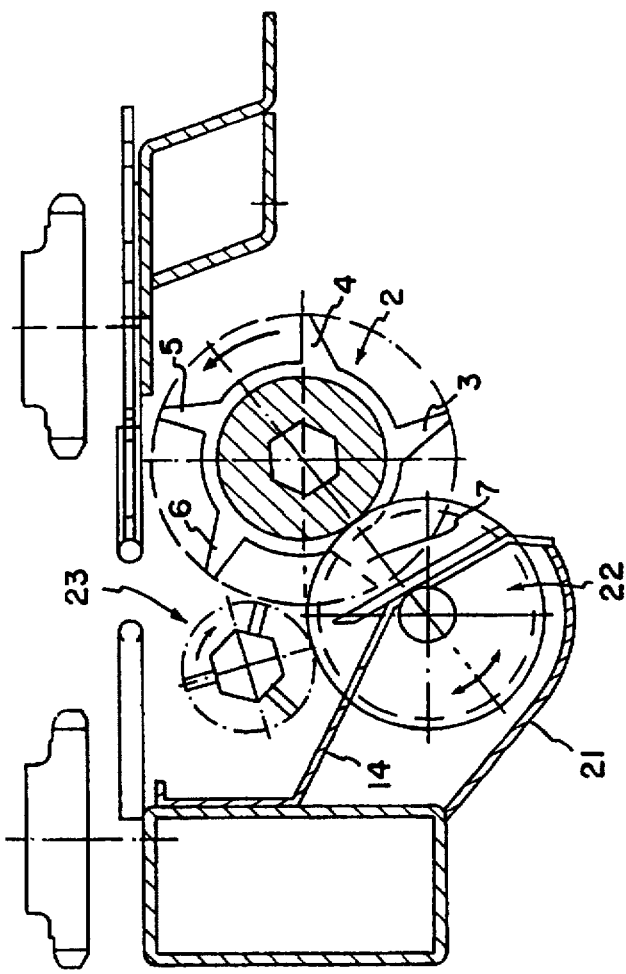
FIG. 5
FIG. 6

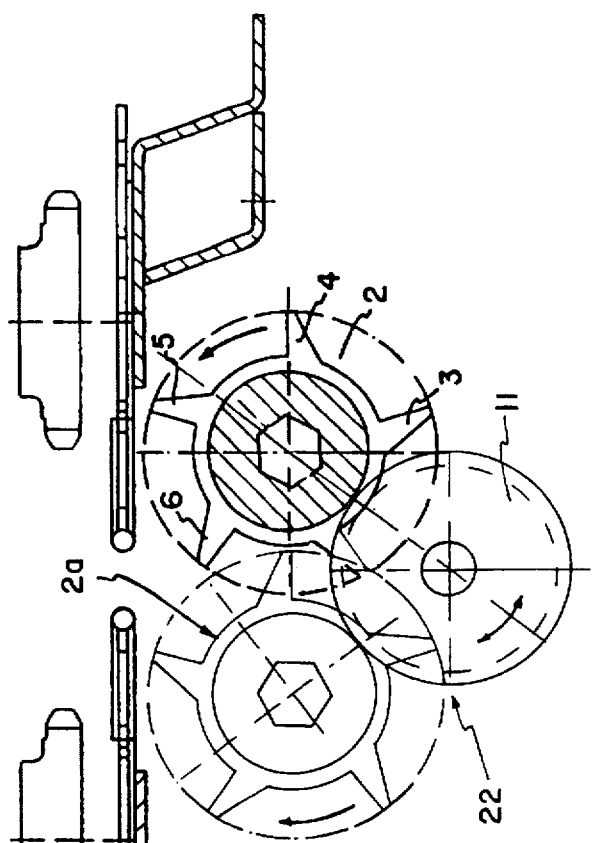
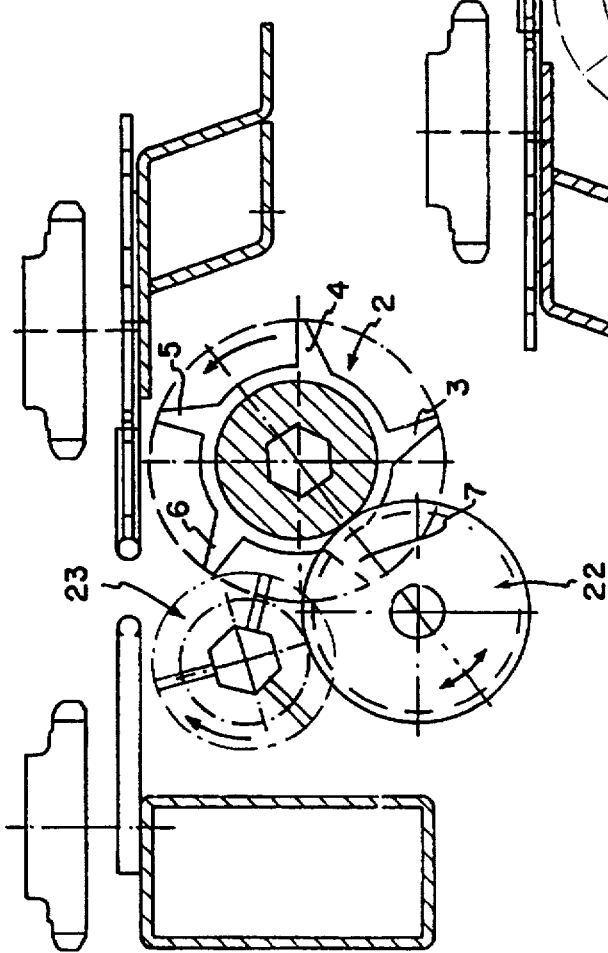

PICKING ATTACHMENT FOR A HARVESTER

FIELD OF THE INVENTION

The invention relates to a picking attachment for a harvester according to the preamble of the main claim.

BACKGROUND OF THE INVENTION

A harvester of the relevant generic type is described in EP 91 635 BI. The essential feature of this harvester is to be seen in the fact that the actual picking attachment has pull-in rotors which are associated with stationary cutters which project into corresponding slits in the blades of the pull-in rotors and thereby effect comminution of the plant. The cutters are here for example arranged at the bottom end of a respective partial covering allocated to each pull-in rotor, while, since the entire picking attachment is inclined forwards, the plant is gripped by means of the pull-in rotors and pulled down through the picking gap, comminution of the plant also being effected by the stationary comminuting cutters due to the pulling-down operation. This known device has given excellent results in practice. In particular, it is an advantage that the stalks are cut at an oblique angle to the longitudinal axis by the pulling-down operation, so that a large rotting surface is thereby made available, which leads to rapid rotting of the chopped stalk material.

With this arrangement the plant stalks are thus fed onto the stationary cutters and compressed, for which relatively great forces are necessary.

From EP-474 072 an attachment for a harvester-thresher or a harvester of similar configuration has become known, in which the cutting device consists of two oppositely rotatable shafts which are arranged at a distance from one another and on which at least one cutting disk and, adjoining the cutting disc, a star element are arranged. The cutting edges of the cooperating cutting disks are arranged to overlap one another. In this known arrangement two pull-in rotors are thus indispensable and the cutting disks are arranged on these pull-in rotors.

Together with the gripping of the plant stalks, in the known arrangement the latter are also cut through, so that the plant stalks are cut off far too soon, that is to say at a moment when the pull-in rotors have not yet by any means securely gripped the plant stalk, so that the entire plant stalk can pass into the thresher together with the corncob, which here must lead to considerable malfunctioning.

Owing to the fact that the cutting disks overlap and are in contact with one another, very heavy wear occurs on the cutting disks, and the energy requirement of this known arrangement is greater than in the case of the prior art machine according to EP 91 635 BI.

The arrangement known from EP 474 072 always requires two pull-in rotors, and therefore cannot be used in conjunction with a partial covering or a mating rotor.

SUMMARY OF THE INVENTION

The object on which the invention is based is that of reducing the expenditure of force in comparison with the known machines, and of additionally ensuring that the plant stalks are securely gripped by the pull-in rotor or rotors before cutting is effected, so that only the ears of the corn or other harvested plants, broken off at the picking gap, thus reach the thresher.

This object underlying the invention is achieved through the doctrine of the main claim.

Advantageous developments are explained in the sub-claims.

Expressed in other words, it is proposed to replace the stationary cutters according to EP 91 635 with rotating cutting disks, so that the cut made by the cutters in the stalk region is not a pushing but a pulling cut, so that the expenditure of force is greatly reduced. In addition, it is proposed according to the invention that the cutting disks form their own cutting roller, that is to say are not combined with one or the other pull-in rotor and—a very essential point—that the axis of the carrier shaft of this cutting roller, viewed from the picking gap, is situated lower than the axis of the pull-in rotor, so that it is thereby ensured that the plant stalks are securely gripped by the pull-in rotor or rotors before the cut is made, so that even after the cut has been made the pull-in rotor or rotors can pull the plant stalks further through in the downward direction.

According to the invention various embodiments are possible for the picking attachment without departing from the basic concept of the invention, namely the use of a separate rotating cutting roller instead of the stationary cutters.

BRIEF DESCRIPTION OF THE DRAWINGS

Exemplary embodiments of the apparatus according to the invention can be seen in the following description given with reference to the drawings, in which:

FIG. 3 shows on a larger scale a section through a first embodiment, FIG. 4 shows a section on the line 4—4 in FIG. 1, FIG. 5 shows a section through a second embodiment, FIG. 6 shows a section through a third embodiment, FIG. 7 shows a section through a fourth embodiment and FIG. 8 shows a section through a fifth embodiment of the invention.

DESCRIPTION OF THE PREFERRED EMBODIMENT

Figure 2:
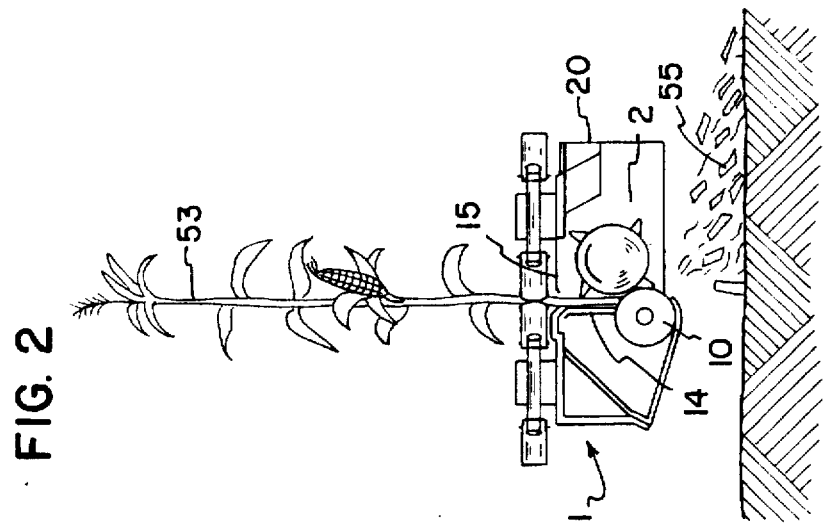
FIG. 2 shows a partial section and a front elevation illustrating the working method.
Figure 1:
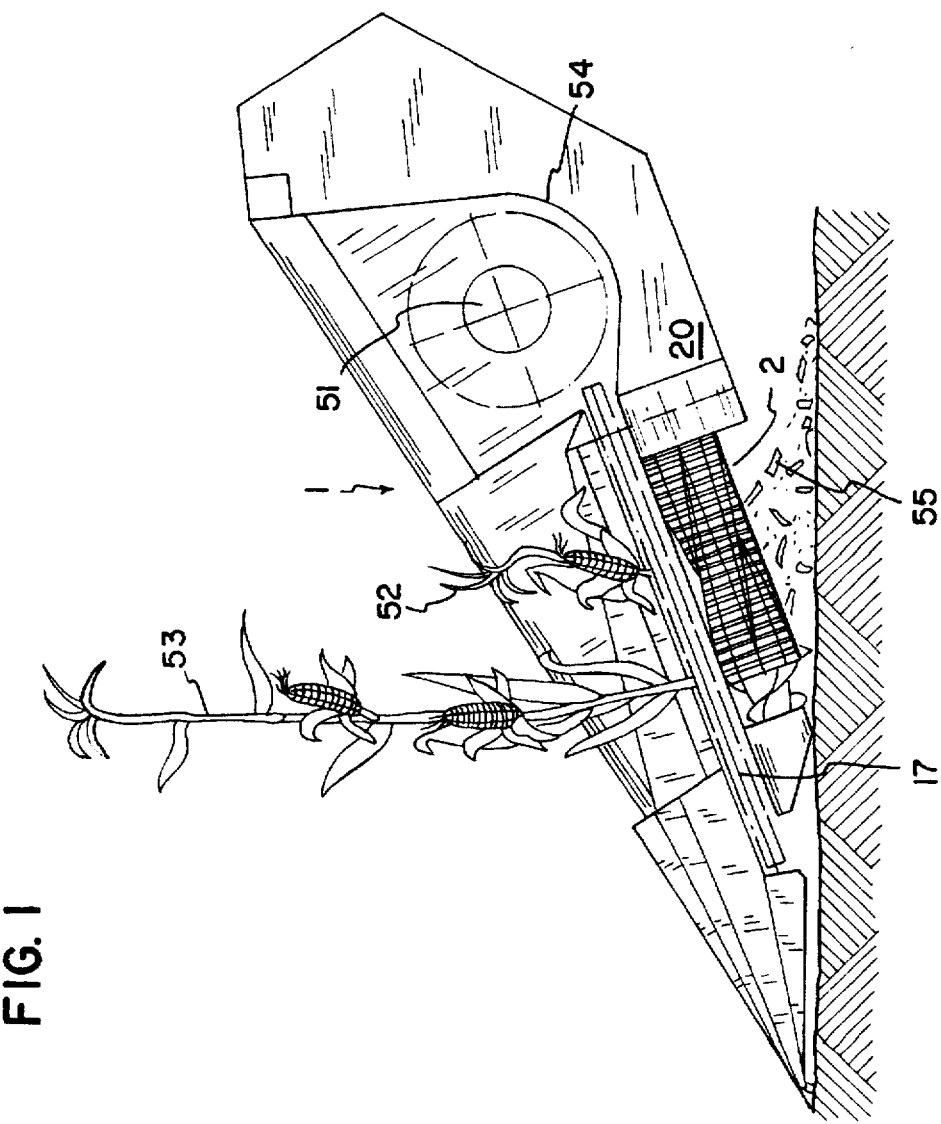
FIG. 1 shows a side view of a picking attachment illustrating the working method.

In FIGS. 1 and 2 a picking attachment 1 is shown, wherein for each row of plants a respective pull-in rotor 2 is provided which is directed in the direction of travel and which on its right-hand side is bounded by a partial covering 14. This partial covering 14 serves as a back support for the pulling-down and cutting of the corn plants 52 and 53, the corn plant 53 being shown still in the upright position while the corn plant 52 has already been partly pulled down and the corncob shown is lying against the breaking edge of a picking gap 15. In the bottom region of the partial covering there are provided cutting tools 10 which, in the exemplary embodiment illustrated in FIG. 2, are in the form of cutting disks of a separate cutting roller. The cutting disks engage in slits in the pull-in rotor 2. As the corn stalks are guided past these cutting tools a chopping process is carried out. The corncobs are stripped off in the picking gap 15 by means of two picking plates 16. The corncob is then carried by means of pull-in chains, for example 17, into a trough 54, in which the corncobs are further transported by a transverse conveyor screw 51.

The chopped material produced by the cutting tools is shown at 55 in FIGS. 1 and 2.

A first embodiment of the picking attachment according to the invention is shown on a larger scale in FIGS. 3 and 4. In FIG. 3 frame members 19 and 20 can be seen, the frame member 19 carrying a partial covering 14 in the bottom region of which is arranged a cutting roller 22, which is formed by a multiplicity of cutting disks 11. These cutting disks 11 are arranged on a carrier shaft 12, and the cutting disks 11 are preferably fastened on the rotatably mounted carrier shaft 12. The direction of rotation of the cutting roller 22, and also that of the pull-in rotor 2, are indicated by the arrows shown in the drawing. It can clearly be seen that the carrier shaft 12, viewed from the picking gap 15, is situated lower than the axis of the pull-in rotor 2. The effect is thereby achieved that during the cutting of the plant the latter is held securely and firmly by the pull-in device (pull-in roller 2 and partial covering 14). At the bottom the arrangement is closed by a cover 21. In the exemplary embodiment shown in FIG. 3, six blades 3, 4, 5, 6, 7 and 8, also referred to as tearing edges, are arranged on the pull-in rotor 2, these blades 3 to 8 being twisted spirally over the entire length of the pull-in rotor in a manner known per se, in order to ensure a continuous torque pattern. Slits 9, into which the cutting disks 11 project, are provided in the blades 3 to 8.

On the frame members 19 and 20 picking plates 16 are provided in the top region and bound a picking gap 15, which in the boundary region is provided with a breaking edge. Above the picking plates 16 are provided pull-in chains 17 and 18, of which only the rotary rotors can be seen in the schematic representation shown in FIG. 3. The picking plates 16 may be hydraulically adjustable.

As is particularly clearly shown in FIG. 4, the cutting disks 11 of the cutting roller 22 engage in corresponding slits 9 in the blades 4 to 8 and also partially in circumferential slits which are likewise provided on the core of the pull-in rotor 2.

In the representation shown in FIG. 5 the partial covering 14 can likewise be seen but, in contrast to FIG. 3, a mating rotor 23 is provided. The actual pull-in rotor 2 has only five blades 3, 4, 5, 6 and 7 and the mating rotor 23 has three blades, these two rotors being controlled such that the blades engage in one another intermittently, that is to say the ends of the blades of the mating rotor 23 engage in the enveloping circle of the pull-in rotor 2.

The blades of the pull-in rotor 2 and the blades of the mating rotor 3 are provided with slits in which the cutting disks 11 of the cutting roller 22, which is mounted in an appropriately low position, engage.

In the embodiment shown in FIG. 6, although a mating roller 23 is likewise provided, the blades of the mating roller 23 are so short that they do not engage in the enveloping circle of the blades of the pull-in rotor 2, and the cutting disks 11 also do not engage in corresponding slits in the blades of the mating rotor 23.

In the embodiment shown in FIG. 7 the partial covering is not provided, and in this embodiment too the possible directions of rotation of the rotating components are indicated by arrows.

Finally, in the embodiment shown in FIG. 8 two pull-in rotors 2 and 2a are provided, cooperating with a cutting roller 22.

In connection with the embodiments described above it should be pointed out that the cutting rollers 22 can be freely rotatable, either in such a manner that the individual cutting disks 11 can rotate freely on a central carrier shaft 12 of the cutting roller 22, or such that the cutting disks 11 are mounted fast on the carrier shaft 12 and the latter now rotates together with the cutting disks 11.

The cutting roller 22 or the cutting disks 11 can be freely rotatable or they may be driven in the opposite direction of rotation to that of the pull-in rotor 2, or they may be driven in the same direction of rotation as the pull-in rotor 2. All these abovementioned possibilities are practicable within the scope of the proposal according to the invention.

However, all the embodiments described above have in common the fact that the cutting roller 22 forms an independent, separate cutting roller, and thus is not a development of the pull-in rotor 2, and that the cutting roller 22 is arranged, relative to the pull-in rotor 2, such that the cut starts only when the plant stalk is securely held by the pull-in device, that is to say can be pulled further down even after the cut has been made.

We claim:

1. A picking attachment for a harvester for harvesting cereals, said attachment having at least one pull-in rotor which is situated beneath a picking gap and a periphery of said rotor being equipped with fixed blades that have slits in which engage comminuting tools, said comminuting tools including rotating cutting disks, wherein the rotating cutting disks are arranged on a carrier shaft to thereby form a cutting roller, an axis of said shaft being directed parallel to an axis of the pull-in rotor, with the axis of the carrier shaft situated lower than the axis of the pull-in rotor; and further including a second pull-in rotor adjacent to said one pull-in rotor and said cutting roller, said pull-in rotors being driven in opposite directions.

2. The picking attachment as claimed in claim 1, wherein the carrier shaft is stationary and the cutting disks arranged thereon are rotatable with respect to said carrier shaft.

3. The picking attachment as claimed in claim 1, wherein the cutting disks are fixedly mounted on the carrier shaft and the carrier shaft is mounted for rotation.

4. The picking attachment as claimed in claim 1, wherein the second pull-in rotor includes fixed blades which have slits therein, and the cutting disks of the cutting roller engage in the slits in the blades of each of said pull-in rotors.

5. The picking attachment as claimed in claim 1, wherein the cutting roller is arranged for free rotation.

6. The picking attachment as claimed in claim 1, wherein the cutting roller and said one pull-in rotor are driven in opposite directions.

7. The picking attachment as claimed in claim 1, wherein the cutting roller and said one pull-in rotor are driven in the same direction.

8. The picking attachment as claimed in claim 1, wherein the second pull-in rotor includes fixed blades which have slits therein, and the cutting disks of the cutting roller engage in the slits of one of said pull-in rotors.

9. A picking attachment for a harvester for harvesting cereals, said attachment having at least one pull-in rotor which is situated beneath a picking gap and a periphery of said rotor being equipped with fixed blades that have slits in which engage comminuting tools, said comminuting tools including rotating cutting disks, wherein the rotating cutting disks are arranged on a carrier shaft to thereby form a cutting roller, an axis of said shaft being directed parallel to an axis of the pull-in rotor, with the axis of the carrier shaft situated lower than the axis of the pull-in rotor; and a mating roller having blades with slits formed therein disposed adjacent to the pull-in rotor, the cutting disks engage in the slits in the blades of at least one of the pull-in rotor and the mating rotor.

10. The picking attachment as claimed in claim 9, wherein the cutting disks engage in the slits in the fixed blades of the pull-in rotor and in the slits in the blades of the mating rotor.

11. The picking attachment as claimed in claim 9, wherein the cutting disks of the cutting roller engage only in the slits in the fixed blades of the pull-in rotor.

* * * * *